United States Patent
Okada et al.

(10) Patent No.: US 11,339,855 B2
(45) Date of Patent: May 24, 2022

(54) TENSIONER

(71) Applicant: TSUBAKIMOTO CHAIN CO., Osaka (JP)

(72) Inventors: Taichi Okada, Osaka (JP); Masanori Watanabe, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 327 days.

(21) Appl. No.: 16/655,597

(22) Filed: Oct. 17, 2019

(65) Prior Publication Data

US 2020/0149614 A1 May 14, 2020

(30) Foreign Application Priority Data

Nov. 12, 2018 (JP) .............................. JP2018-212141

(51) Int. Cl.
*F16H 7/08* (2006.01)

(52) U.S. Cl.
CPC ....... *F16H 7/08* (2013.01); *F16H 2007/0806* (2013.01); *F16H 2007/0812* (2013.01)

(58) Field of Classification Search
CPC ............... F16H 2007/0846; F16H 7/08; F16H 2007/0806; F16H 2007/0812
USPC ....................................................... 474/110
See application file for complete search history.

(56) References Cited

U.S. PATENT DOCUMENTS

| | | | | |
|---|---|---|---|---|
| 5,277,664 A * | 1/1994 | Mott | ..................... | F16H 7/0848 474/110 |
| 5,704,860 A * | 1/1998 | Stief | ......................... | F16H 7/08 474/110 |
| 7,189,175 B2 * | 3/2007 | Maino | ................... | F16H 7/0848 474/110 |
| 7,427,250 B2 * | 9/2008 | Yoshida | ................ | F16H 7/0836 474/109 |
| 8,419,575 B2 * | 4/2013 | Yoshida | ................ | F16H 7/0848 474/110 |
| 2003/0017893 A1 | 1/2003 | Kaido et al. | | |
| 2006/0229151 A1 * | 10/2006 | Jansen | .................. | F16H 7/1218 474/117 |
| 2007/0179001 A1 * | 8/2007 | Sass | ...................... | F16H 7/0848 474/109 |
| 2008/0261736 A1 * | 10/2008 | Onimaru | ............... | F16H 7/0848 474/110 |
| 2010/0048334 A1 * | 2/2010 | Kern | ..................... | F16H 7/0848 474/110 |

(Continued)

FOREIGN PATENT DOCUMENTS

JP  2003-20206 A  1/2003
JP  2003-35343 A  2/2003

*Primary Examiner* — Gene O Crawford
*Assistant Examiner* — Emily Rose Kincaid
(74) *Attorney, Agent, or Firm* — WHDA, LLP

(57) ABSTRACT

An object of the present invention is to provide a tensioner that has a reduced number of components and weight, and is easy to assemble. The tensioner has a base member loosely fitted into an open rear end of a cylindrical plunger with a closed front end against the resiliency of a biasing means accommodated inside the plunger. The tensioner includes a plunger stopper mechanism configured such that an engaging part formed on the base member detachably engages an engaging groove provided on an inner circumferential surface of the plunger directly or via another member.

7 Claims, 9 Drawing Sheets

(56) References Cited

U.S. PATENT DOCUMENTS

| | | | |
|---|---|---|---|
| 2010/0050969 A1* | 3/2010 | Kameda | F01L 1/22 123/90.45 |
| 2011/0111898 A1* | 5/2011 | Mishima | F16H 7/0848 474/101 |
| 2017/0356529 A1* | 12/2017 | Simmons | F16H 7/0848 |

* cited by examiner

TENSIONER

BACKGROUND OF THE INVENTION

1. Field of the Invention

The present invention relates to a tensioner having a plunger and a biasing means accommodated in an oil pressure chamber formed inside the plunger such as to freely extend and contract, the tensioner not having a housing for supporting the plunger.

2. Description of the Related Art

Tensioners that maintain correct tension of chains are commonly used. In a chain guide mechanism that slidably guides a drive chain such as an endless roller chain passing over respective sprockets of a crankshaft and a cam shaft inside an engine room with a guide shoe, for example, it is known to press a pivoting chain guide having the guide shoe with a tensioner to maintain correct tension.

The known tensioner used in such a chain guide mechanism generally includes a housing having a cylindrical plunger bore with an open end, a cylindrical plunger inserted in the plunger bore to freely slide against a cylindrical surface of the plunger bore, and means for biasing the plunger frontward to extend out of the plunger bore.

After the assembly, the plunger of the tensioner need to be retained under pressure until the tensioner is fixed in position in an engine or the like to be used and ready to actually apply tension to a chain or the like. Various tensioners having a plunger stopper mechanism for keeping the plunger pushed inside of the housing to stop the plunger from coming out have been proposed before (see, for example, Japanese Patent Applications Laid-open Nos. 2003-020206 and 2003-035343).

SUMMARY OF THE INVENTION

The housing used in the tensioner is commonly made of metal such as cast iron, aluminum alloy or the like and heavy itself. The weight of the whole engine in which the tensioner is installed is consequently increased, which leads to poorer fuel efficiency of the engine. It is therefore desired for tensioners to be more lightweight in view of the recent demand for better fuel economy of automobiles in which tensioners are installed. From a weight reduction point of view, the tensioner should preferably not include a housing. However, known tensioners are configured with a housing where a mounting part is formed for fixedly attaching the tensioner to an object to which the tensioner is mounted, with the use of a suitable fixing member as required. Also, the plunger stopper mechanism for preventing the plunger from coming out is usually configured to fix the plunger to a housing, which makes it hard to design the tensioner without a housing.

The present invention was made in view of the circumstances described above, its object being to provide a tensioner that has a reduced number of components and weight, and is easy to assemble.

The present invention solves the problems described above by providing a tensioner including: a cylindrical plunger with a closed front end; a biasing means accommodated in an oil pressure chamber that is formed inside the plunger such as to freely extend and contract; a cylindrical base member loosely fitted into an open rear end of the plunger against resiliency of the biasing means; and a plunger stopper mechanism that prevents the plunger from extending out from the base member, the plunger stopper mechanism being made up of an engaging groove provided on an inner circumferential surface of a rear end portion of the plunger such as to extend circumferentially all around, and an engaging part provided on a front end portion of the base member to detachably engage a locking notch formed by the engaging groove directly or via another member.

The tensioner according to claim 1 of the present invention has the plunger stopper mechanism made up of an engaging groove provided on an inner circumferential surface of a rear end portion of the plunger such as to extend circumferentially all around, and an engaging part provided on a front end portion of the base member to detachably engage a locking notch formed by the engaging groove directly or via another member.

Therefore, the tensioner according to claim 1 of the present invention does not need a housing for supporting the plunger. The number of components of the tensioner is accordingly reduced, as a result of which the tensioner can be made significantly lighter. The reduction in weight of the tensioner is expected to contribute to better fuel economy of the engine.

The configuration according to claim 2 of the present invention allows the plunger to be unlocked by a simple operation wherein the plunger is slid rearward in a spring compressing direction. Assembling of the tensioner to the object to which it is mounted can be thus carried out easily, and the work efficiency can be increased.

The configurations according to claims 3 and 4 of the present invention allow the plunger to be unlocked by a simple operation wherein the plunger is rotated relative to the base member. Assembling of the tensioner to the object to which it is mounted can be thus carried out easily, and the work efficiency can be increased. According to the configuration set forth in claim 4, in particular, the plunger can be retained to the base member without using another component such as a C-ring or a ball. The number of components of the tensioner can be further reduced. Also, the plunger can be locked to and unlocked from the base member freely, which offers a high level of convenience.

The configurations according to claims 5 to 7 of the present invention allow the tensioner to be assembled very easily. As no fixing member such as a bolt is necessary for attachment to an object to which the tensioner is mounted, the work efficiency can be improved.

DESCRIPTION OF THE PREFERRED EMBODIMENTS

The tensioner of the present invention does not include a housing for supporting the plunger, and is assembled to an object to which the tensioner is mounted, for example an engine block, by being inserted into a tensioner insertion hole that has an oil discharge hole. The tensioner of the present invention may also be inserted in a suitable housing member when used.

Embodiment 1

Figure 1:
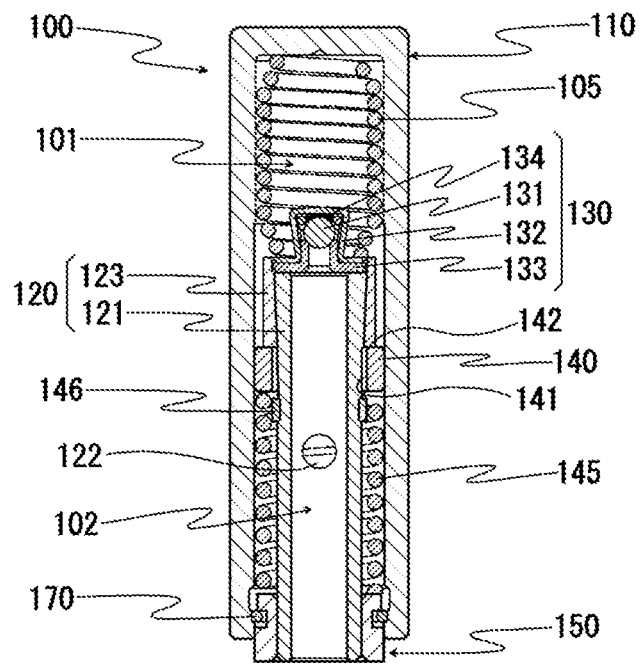
FIG. 1 is a cross-sectional view along an axial direction illustrating one configuration example of a tensioner according to a first embodiment of the present invention.

The tensioner 100 according to one embodiment of the present invention includes, as shown in FIG. 1, a cylindrical plunger 110 with a closed front end, and a coil spring 105 that is a biasing means accommodated in an oil pressure chamber 101 formed inside the plunger 110 such as to freely extend and contract.

Inside the plunger 110 are disposed an inner sleeve 120 including a pressure adjusting unit that prevents the pressure in the oil pressure chamber 101 from exceeding a predetermined level, and a check valve unit 130 that stops reverse flow of the oil flowing into the oil pressure chamber 101.

The inner sleeve 120 has a rear end axially protruding out from the open end face of the plunger 110. A cylindrical base member 150 is fitted on the rear end of the inner sleeve 120 to be inserted with a loose fit into the rear opening of the plunger 110 against the resiliency of the coil spring 105.

The plunger 110 includes an engaging groove 111 that extends circumferentially all around in an inner circumferential surface at the rear end and forms a locking notch 113, and a release groove 112 on the front side of the engaging groove 111 and deeper than the engaging groove 111.

The inner sleeve 120 in this embodiment is made up of an inner tube member 121, and an outer tube member 123 fitted on a front end of the inner tube member 121 on the side facing the oil pressure chamber 101 to form a movement restricting part. As long as it is formed with a movement restricting part at the front end facing the oil pressure chamber 101, the inner sleeve 120 may be formed from a single component.

The outer tube member 123 protrudes to the front side from the front end face of the inner tube member 121, and the space defined by the inner circumferential surface of the outer tube member 123 and the front end face of the inner tube member 121 forms a check valve unit setting part.

The check valve unit 130 includes a check ball 131, a retainer 132 holding the check ball 131 inside, a check valve seat 133 that opens and closes as the check ball 131 sits thereon and separates therefrom, and a ball pressing spring 134 that lightly presses the check ball 131 toward the check valve seat 133 inside the retainer 132.

The pressure adjusting unit includes an annular relief valve 140 that slidably fits on the outer circumferential surface of the inner tube member 121 of the inner sleeve 120 and makes slidable contact with the inner circumferential surface of the plunger 110, a relief spring 145 that biases the relief valve 140 toward the movement restricting part, and a restriction member 146 provided at a predetermined position on the outer circumferential surface of the inner tube member 121 to restrict rearward movement of the relief valve 140. In this embodiment, the restriction member 146 is made from a ring-like member such as a C-ring, for example, which is fitted on the outer circumferential surface of the inner tube member 121.

The relief valve 140 includes a relief groove 141 for allowing the oil from the oil pressure chamber 101 to flow. The relief valve 140 has a front seal surface 142 in the front end face, which makes contact with the rear end face of the outer tube member 123 of the inner sleeve 120 to seal the oil pressure chamber 101.

In the configuration described above, the oil pressure chamber 101 is formed by the inner space of the plunger 110 that is disposed on the front side of the relief valve 140, and an oil reservoir chamber 102 is formed by the inner space of the inner sleeve 120 disposed on the rear side of the relief valve 140 and an annular space formed between the plunger 110 and the inner sleeve 120. The annular space formed between the plunger 110 and the inner sleeve 120 and the inner space of the sleeve 120 communicate with each other via a reserve hole 122 formed in the inner tube member 121 of the inner sleeve 120.

Figure 2:
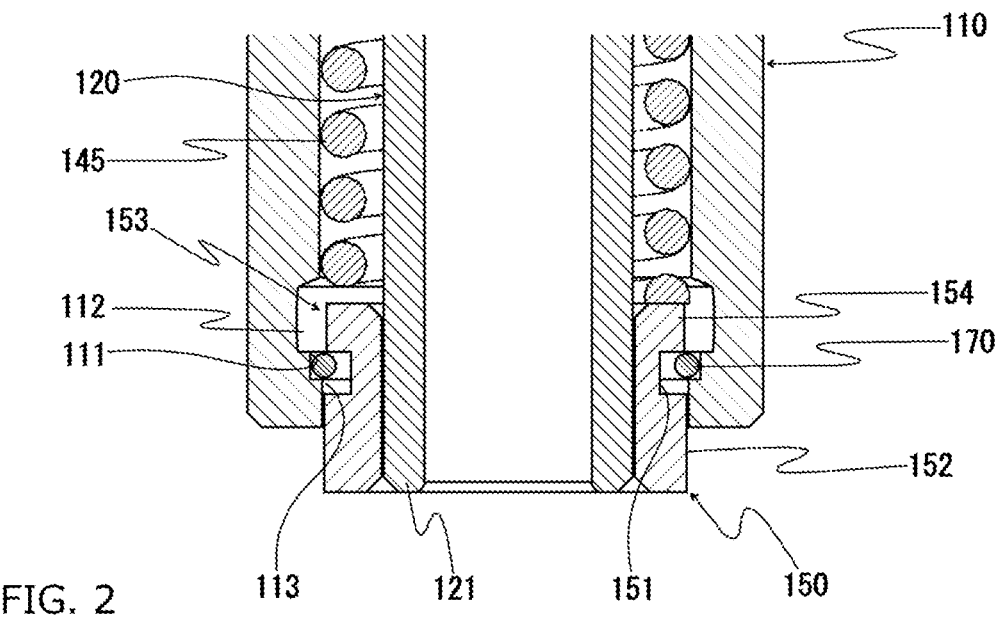
FIG. 2 is an enlarged view illustrating part of the tensioner shown in FIG. 1.

A circumferential groove 151 is formed on the outer circumferential surface of the base member 150 to extend circumferentially all around as shown in FIG. 2. A flange part 154 that forms an engaging part 153 is provided at the front end of the circumferential groove 151, and a base part 152 is formed at the rear end, to be inserted into the rear opening of the plunger 110 with a loose fit.

The tensioner 100 of this embodiment includes a plunger stopper mechanism for preventing the plunger 110 from extending out from the base member 150, made up of the engaging groove 111 in the plunger 110, and the flange part 154 of the base member 150 that detachably engages the locking notch 113 formed by the engaging groove 111 via a C-ring 170.

The C-ring 170 is disposed on an end face of the locking notch 113 in a radially compressed state so that it presses the inner circumferential surface of the engaging groove 111 radially outward. In the tensioner 100 of this embodiment, the C-ring 170 is sandwiched between the end face of the locking notch 113 of the plunger 110 and the rear end face of the flange part 154 of the base member 150 by the resiliency of the coil spring 105 and the relief spring 145, whereby the plunger 110 is locked to the base member 150.

To assemble the tensioner 100 of this embodiment, the C-ring 170 is set inside the circumferential groove 151 of the base member 150 in an elastically deformed state so that it is radially reduced (radially compressed), and with the C-ring in this state, the base member 150 fixedly fitted to the inner sleeve 120 is inserted into the plunger 110 against the resiliency of the coil spring 105 and the relief spring 145. As the C-ring 170 is released from the engagement with the inner circumferential surface of the plunger 110, it expands radially by its own resiliency to restore its shape, and rests on the end face of the locking notch 113 where it presses the inner circumferential surface of the engaging groove 111.

Figure 3A:
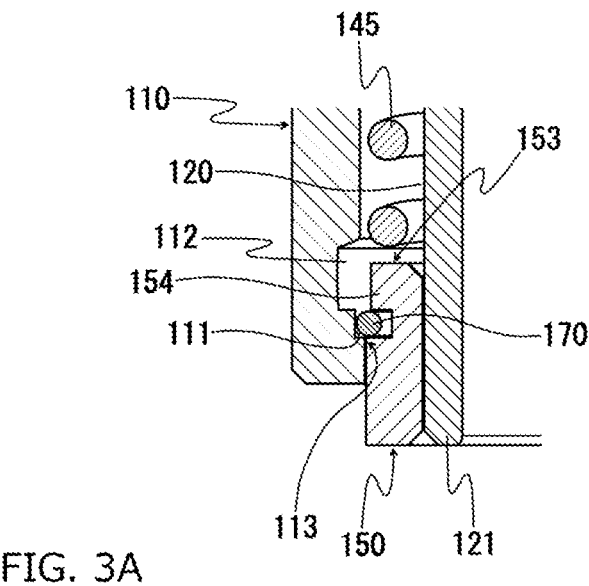
FIG. 3A is a schematic diagram for explaining an operation of unlocking the plunger of the tensioner shown in FIG. 1, wherein the plunger is locked to a base member.
Figure 3B:
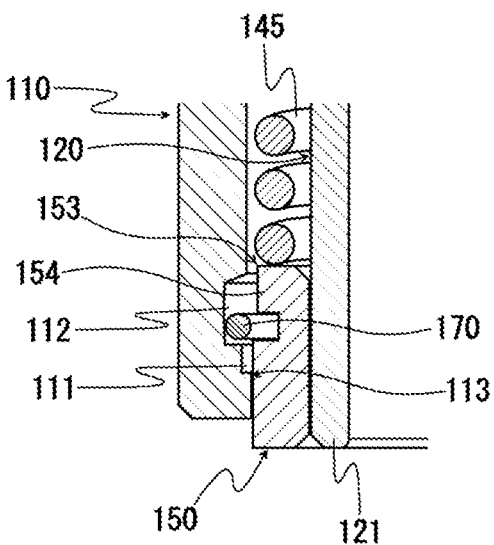
FIG. 3B is a schematic diagram for explaining the operation of unlocking the plunger of the tensioner shown in FIG. 1, wherein a C-ring is disengaged from a circumferential surface of an engaging groove of the plunger.
Figure 3C:
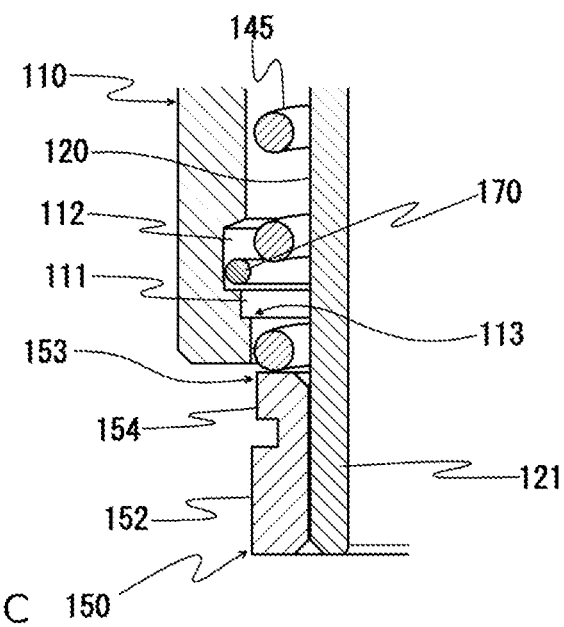
FIG. 3C is a schematic diagram for explaining the operation of unlocking the plunger of the tensioner shown in FIG. 1, wherein the plunger is unlocked from the base member.

The plunger stopper mechanism according to this embodiment allows the plunger 110 to be unlocked very easily. Namely, from the state wherein the plunger 110 is locked to the base member 150 as shown in FIG. 3A, by sliding the plunger 110 backward that is a spring compressing direction as shown in FIG. 3B, the C-ring 170 is released from the engagement with the inner circumferential surface of the engaging groove 111 of the plunger 110. This results in the C-ring 170 radially expanding by its own resiliency to restore the original shape, and being rested inside the release groove 112, where it presses the circumferential surface of the release groove 112. The plunger 110 is freed from the state wherein it is locked to the base member 150 so that the tensioner 100 becomes usable, with the plunger 110 being able to extend out and retract, as shown in FIG. 3C.

Here, the inner peripheral edge of the C-ring 170 positioned inside the release groove 112 is located on the radially outer side than the inner circumferential surface of the plunger 110, and therefore, the possibility of the C-ring 170 remaining inside the plunger 110 hindering the movement of the plunger 110 is reliably avoided.

As described above, the plunger stopper mechanism of the tensioner 100 according to this embodiment is configured such that the engaging part 153 of the base member 150 detachably engages the locking notch 113 of the plunger 110 via the C-ring 170, and that the plunger 110 can be unlocked by being slid in the spring compressing direction.

Figure 4:
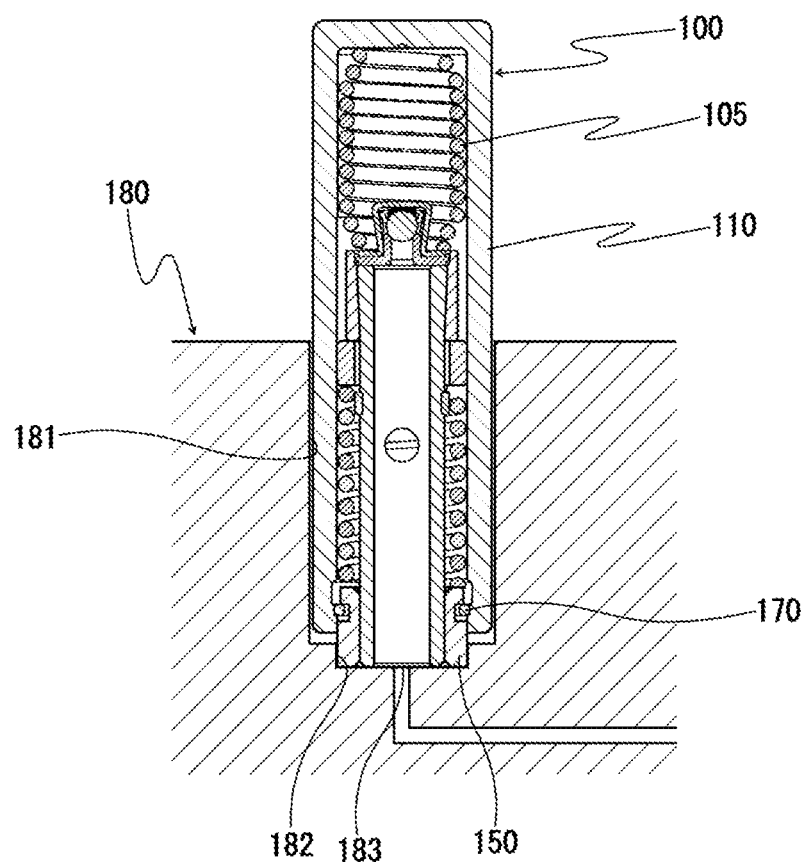
FIG. 4 is a schematic cross-sectional view illustrating a structure for attaching the tensioner shown in FIG. 1 to an object to which the tensioner is mounted.

When in use, the tensioner 100 of this embodiment can be inserted in a tensioner insertion hole 181 of the object 180 to which the tensioner is mounted such as an engine block, for example, as shown in FIG. 4, with the plunger 110 being locked to the base member 150. The tensioner insertion hole 181 may be one that has a base member mounting recess 182 at the bottom, and an oil discharge hole 183 opened in the bottom of the base member mounting recess 182, and accommodates the plunger 110 slidably.

The tensioner 100 of this embodiment allows the plunger 110 to be unlocked after being attached to the object 180 to which the tensioner is mounted.

In the tensioner 100 of this embodiment, it is preferable that the base member 150 has the mounting part 160 for the attachment to the object 180 to which the tensioner mounted.

Figure 5:
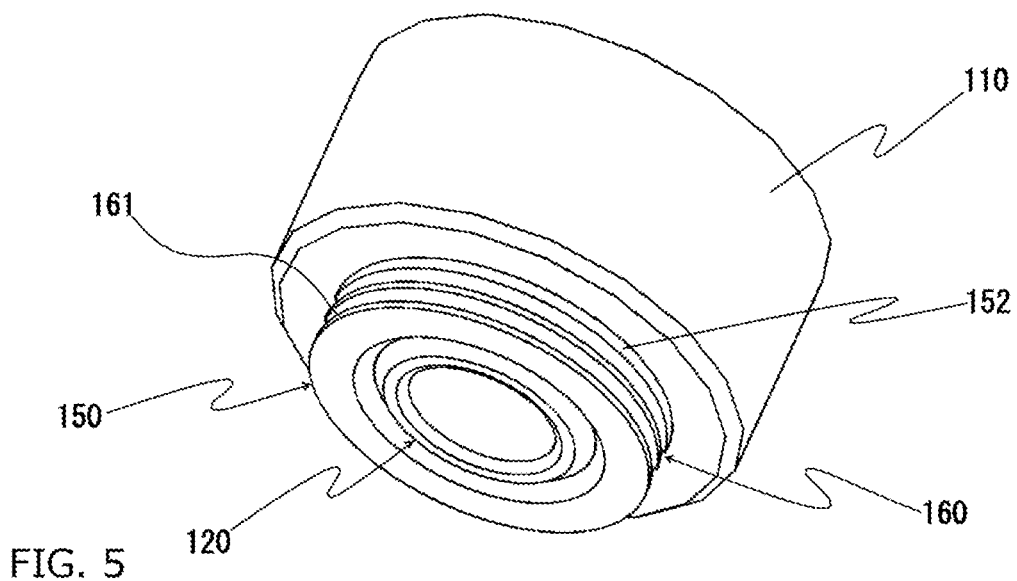
FIG. 5 is a schematic perspective view illustrating one configuration example of a mounting part for attaching the tensioner to an object to which it is mounted.

The mounting part 160 can be formed by a thread groove 161 on the outer circumferential surface of the base part 152 of the base member 150, for example, as shown in FIG. 5.

Figure 6:
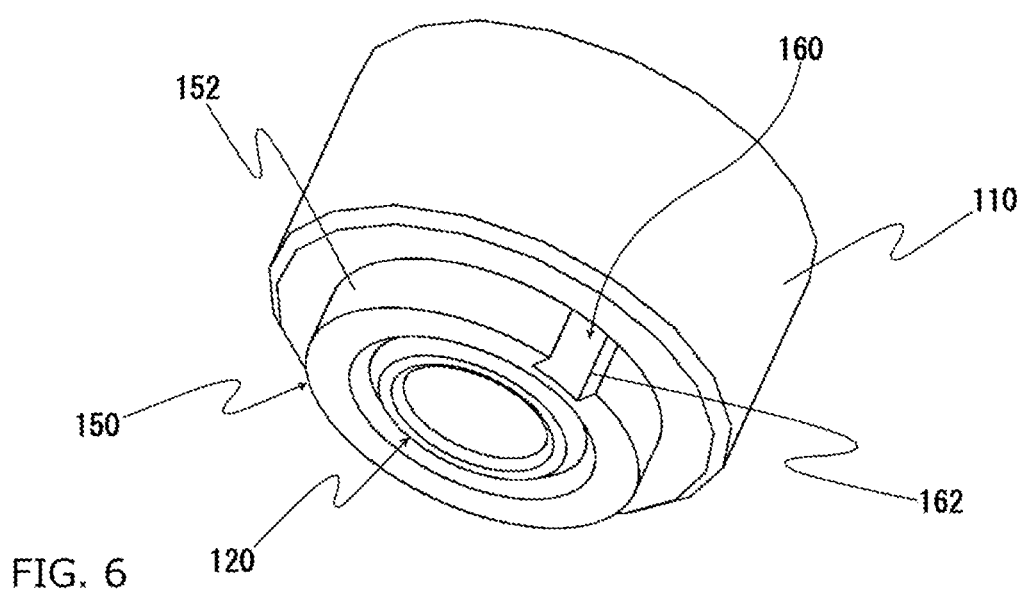
FIG. 6 is a schematic perspective view illustrating another configuration example of the mounting part for attaching the tensioner to an object to which it is mounted.

The mounting part 160 can also be formed by an axially extending engaging groove 162 on the outer circumferential surface of the base part 152 of the base member 150, for example, as shown in FIG. 6. Alternatively, the mounting part 160 can be formed by a rear end portion of the base member 150 configured to be fitted into the base member mounting recess 182 in the object 180 to which the tensioner is mounted.

Embodiment 2

The tensioner according to a second embodiment of the present invention has the same configuration as the tensioner 100 according to the first embodiment described above except that the plunger stopper mechanism for preventing the plunger from extending out has a different configuration.

The plunger stopper mechanism of the tensioner according to the second embodiment is configured such that the plunger is unlocked by rotating the base member relative to the plunger.

Figure 7:
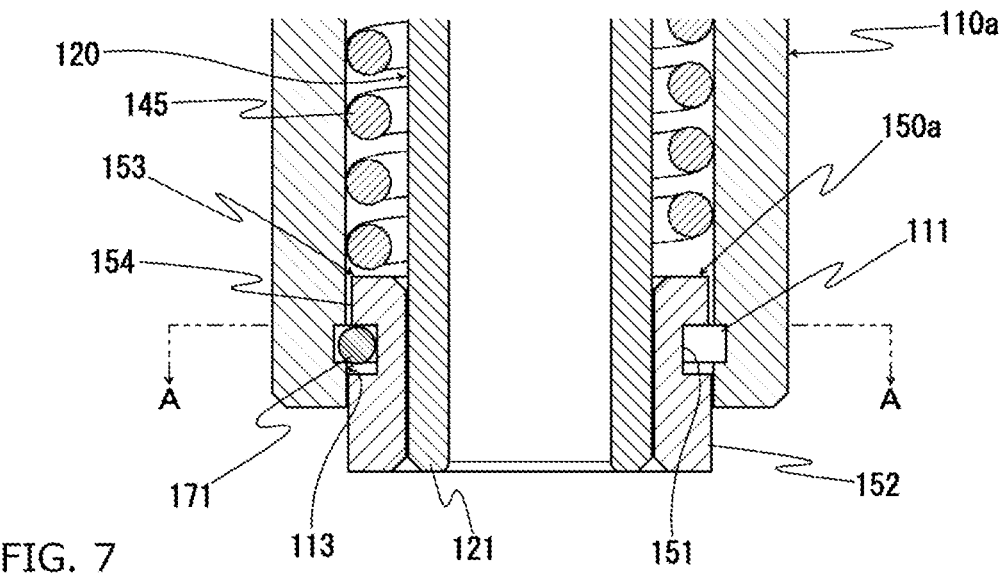
FIG. 7 is a cross-sectional view along an axial direction illustrating major parts of one configuration example of a tensioner according to a second embodiment of the present invention.
Figure 8:
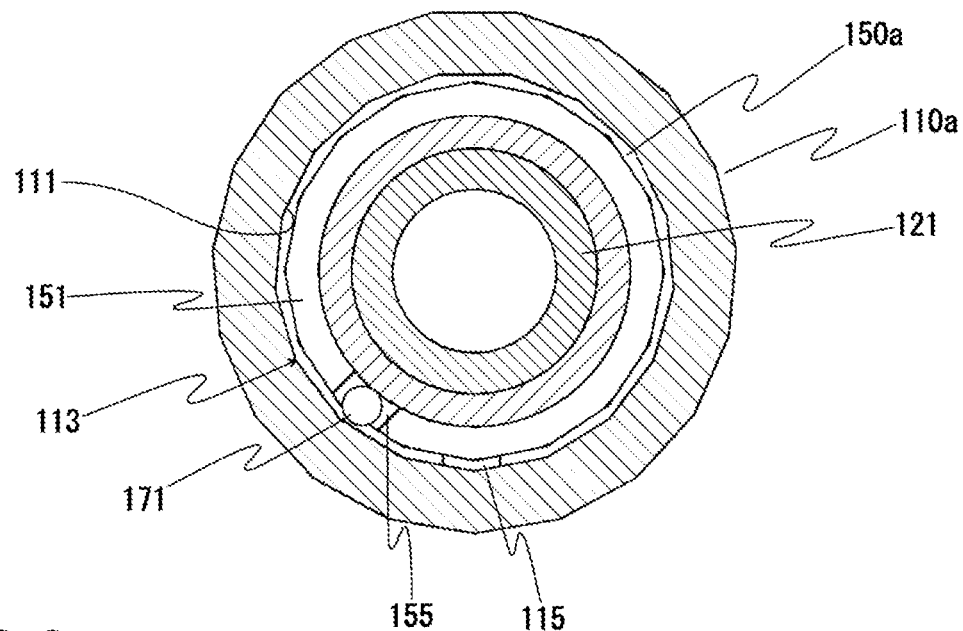
FIG. 8 is a cross-sectional view showing an A-A section of FIG. 7.

As shown in FIG. 7 and FIG. 8, the plunger 110a in the tensioner according to the second embodiment has an engaging groove 111 that forms a locking notch 113 in the inner circumferential surface in an edge portion near the open end.

The base member 150a has a circumferential groove 151 extending circumferentially all around on the outer circumferential surface, a base part 152 axially on the rear side of the circumferential groove 151 to be abutted on the inner circumferential surface of the plunger 110a, and a flange part 154 that forms an engaging part 153 axially on the front side of the circumferential groove 151.

The tensioner according to the second embodiment includes an axially extending ball release groove provided on at least one of the inner circumferential surface of the plunger 110a and the outer circumferential surface of the base member 150a and configured to allow a ball 171, to be described later, to be taken out when the base member 150a is rotated relative to the plunger 110a. In this embodiment, the inner circumferential surface of the plunger 110a and the outer circumferential surface of the base part 152 of the base member 150a are respectively formed with ball release grooves 115 and 155.

The plunger stopper mechanism of the tensioner according to this embodiment is made up of the engaging groove 111 of the plunger 110a, and the flange part 154 of the base member 150a that detachably engages the locking notch 113 formed by the engaging groove 111 via the ball 171. The ball 171 has a larger outside diameter than the groove depth of the circumferential groove 151 of the base member 150a.

In the tensioner of this embodiment, the ball 171 is sandwiched between the end face of the locking notch 113 of the plunger 110a and the rear end face of the flange part 154 of the base member 150a by the resiliency of the coil spring 105 and the relief spring 145, whereby the plunger 110a is locked to the base member 150a.

The tensioner of this embodiment can be assembled as follows. First, the base member 150a fixedly fitted to the inner sleeve 120 is inserted into the plunger 110a against the resiliency of the coil spring 105 and the relief spring 145. Next, the ball release groove 115 of the plunger 110a is circumferentially aligned with the ball release groove 155 of the base member 150a, and in this state, the ball 171 is put into the plunger 110a through the ball release grooves 115 and 155. The base member 150a is then rotated relative to the plunger 110a, to cause the ball 171 to be sandwiched between the end face of the locking notch 113 of the plunger 110a and the rear end face of the flange part 154 of the base member 150a, with the use of the resiliency of the coil spring 105 and the relief spring 145. Thus the locked state wherein the plunger 110a is retained to the base member 150a can be obtained.

Figure 9A:
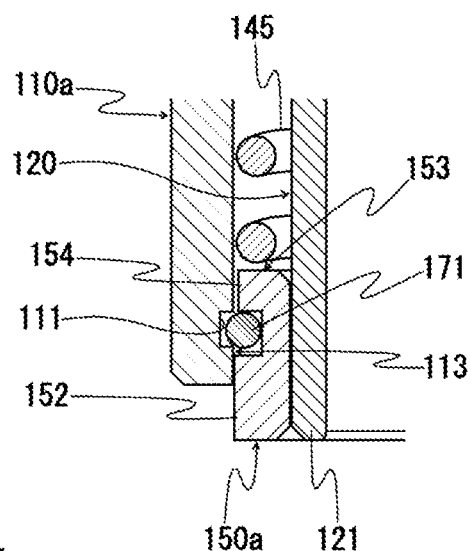
FIG. 9A is a schematic diagram for explaining an operation of unlocking the plunger of the tensioner shown in FIG. 7, wherein the plunger is locked to the base member.
Figure 9B:
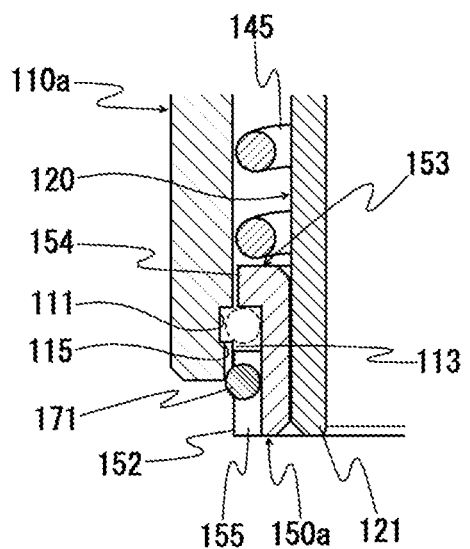
FIG. 9B is a schematic diagram for explaining the operation of unlocking the plunger of the tensioner shown in FIG. 7, wherein a ball is taken out of the plunger.
Figure 9C:
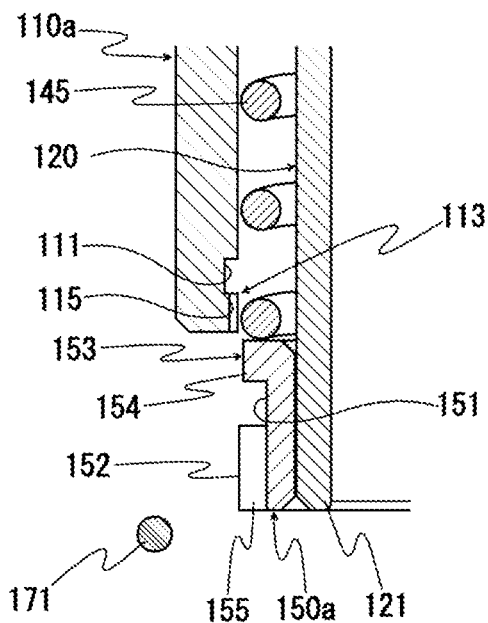
FIG. 9C is a schematic diagram for explaining the operation of unlocking the plunger of the tensioner shown in FIG. 7, wherein the plunger is unlocked from the base member.

The plunger stopper mechanism according to this embodiment allows the plunger 110a to be unlocked very easily, too. Namely, from the state wherein the plunger 110a is locked to the base member 150a as shown in FIG. 9A, by rotating the plunger 110a relative to the base member 150a as shown in FIG. 9B, the ball release groove 115 of the plunger 110a is circumferentially aligned with the ball release groove 155 of the base member 150a. The ball 171 is then taken out of the plunger 110a through the ball release grooves 115 and 155, whereby the plunger 110a is freed from the state wherein it is locked to the base member 150a so that the tensioner becomes usable, i.e., with the plunger 110a being able to extend out and retract, as shown in FIG. 9C.

As described above, the plunger stopper mechanism of the tensioner according to this embodiment is configured such that the engaging part 153 of the base member 150a is engaged with the locking notch 113 of the plunger 110a via the ball 171, and that the plunger 110a can be unlocked by rotating the base member 150a relative to the plunger 110a.

Embodiment 3

The tensioner according to a third embodiment of the present invention has the same configuration as the tensioner 100 according to the first embodiment described above except that the plunger stopper mechanism for preventing the plunger from extending out has a different configuration.

The plunger stopper mechanism of the tensioner according to the third embodiment is configured such that the plunger is unlocked by rotating the base member relative to the plunger similarly to the tensioner according to the second embodiment.

Figure 10:
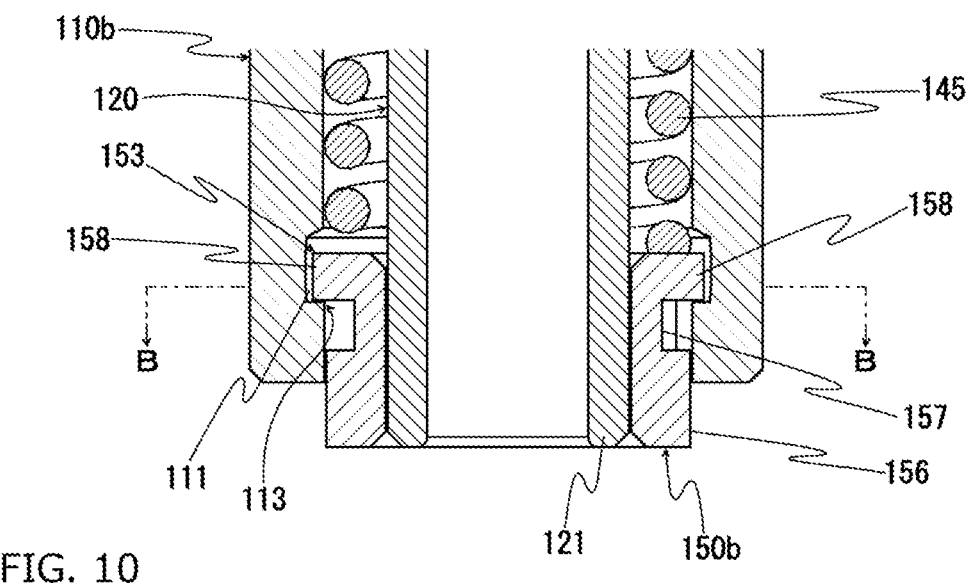
FIG. 10 is a cross-sectional view along an axial direction illustrating major parts of one configuration example of a tensioner according to a third embodiment of the present invention.
Figure 11:
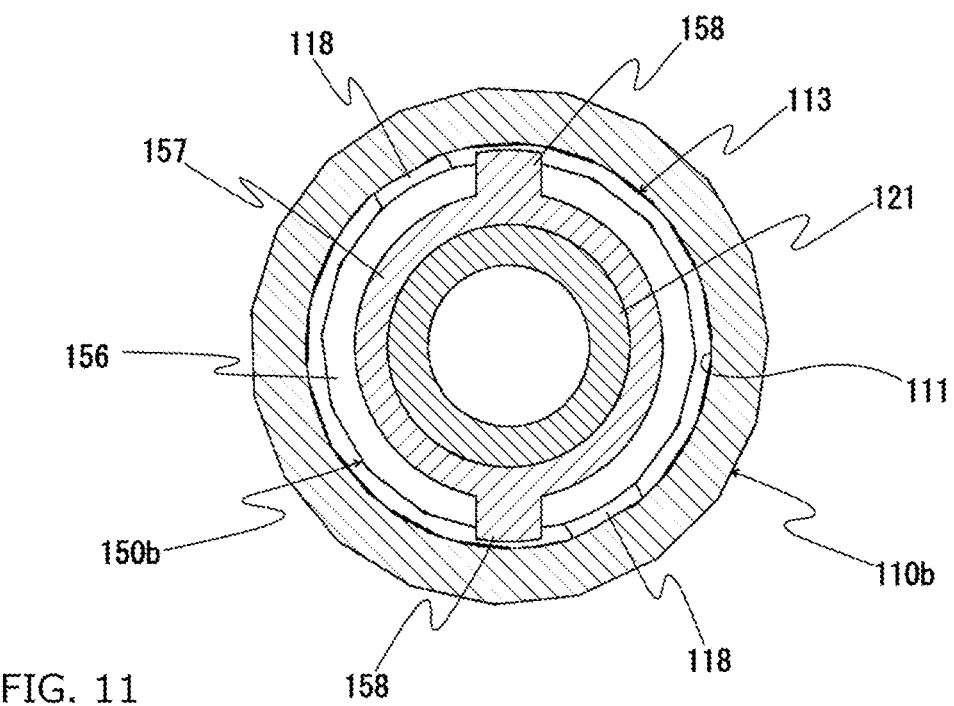
FIG. 11 is a cross-sectional view showing a B-B section of FIG. 10.

As shown in FIG. 10 and FIG. 11, the plunger 110b in the tensioner according to the third embodiment has an engaging groove 111 that forms a locking notch 113 in the inner circumferential surface in an edge portion near the open end, and an engaging part guide groove 118 extending axially from the open end edge. In this embodiment, two engaging part guide grooves 118 are provided circumferentially opposite each other with respect to the center axis of the plunger 110b.

The base member 150b has a large-diameter tubular part 156 to be abutted on the inner circumferential surface of the plunger 110b, a small-diameter tubular part 157 continuous with the front end of the large-diameter tubular part 156 via a step, and an engaging part 153 at the front end of the small-diameter tubular part 157. In this embodiment, the engaging part 153 is made up of a pair of plate-like protruding pieces 158, 158 provided circumferentially opposite each other with respect to the center axis of the plunger 110b and protruding radially outward. The outer edges of the plate-like protruding pieces 158, 158 are located on the radially outer side than the outer circumferential edge of the large-diameter tubular part 156.

The plunger stopper mechanism in the tensioner of this embodiment is made up of the engaging groove 111 in the plunger 110b, and the plate-like protruding pieces 158 of the base member 150b, detachably engaged directly with the locking notch 113 formed by the engaging groove 111.

The tensioner of this embodiment can be assembled as follows. First, the plate-like protruding pieces 158, 158 of the base member 150b fixedly fitted to the inner sleeve 120 are aligned with the engaging part guide grooves 118, 118 in the plunger 110b, and the base member 150b is inserted into the plunger 110b against the resiliency of the coil spring 105 and the relief spring 145. Next, the base member 150b is rotated relative to the plunger 110b, to cause the plate-like protruding pieces 158, 158 to engage the locking notch 113 of the plunger 110b, with the use of the resiliency of the coil spring 105 and the relief spring 145. Thus the locked state wherein the plunger 110b is retained to the base member 150b can be obtained.

Figure 12A:
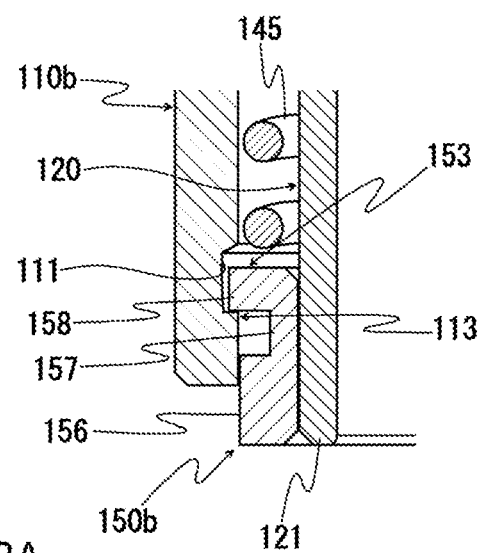
FIG. 12A is a schematic diagram for explaining an operation of unlocking the plunger of the tensioner shown in FIG. 11, wherein the plunger is locked to the base member.
Figure 12B:
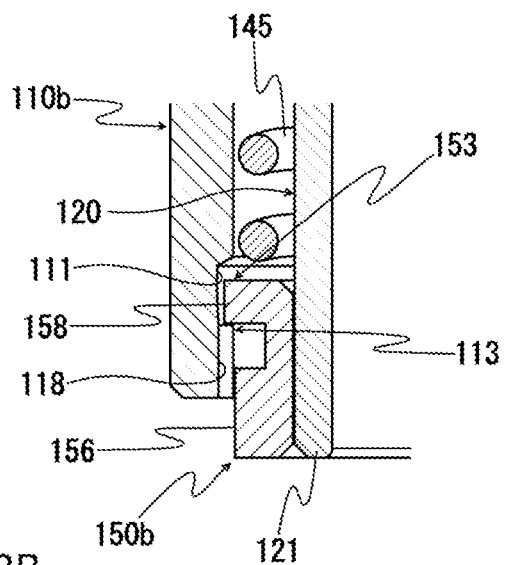
FIG. 12B is a schematic diagram for explaining the operation of unlocking the plunger of the tensioner shown in FIG. 11, wherein an engaging part guide groove of the plunger and a plate-like protruding piece of the base member are circumferentially aligned with each other.
Figure 12C:
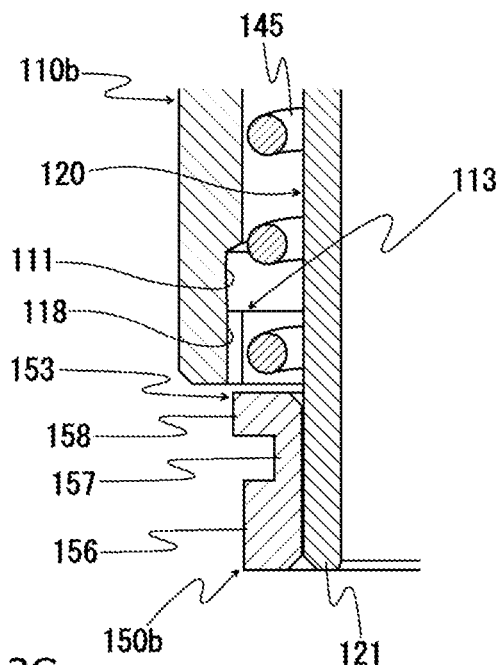
FIG. 12C is a schematic diagram for explaining the operation of unlocking the plunger of the tensioner shown in FIG. 11, wherein the plunger is unlocked from the base member.

The plunger stopper mechanism according to this embodiment allows the plunger 110b to be unlocked very easily, too. Namely, from the state wherein the plunger 110b is locked to the base member 150b as shown in FIG. 12A, by rotating the plunger 110b relative to the base member 150b as shown in FIG. 12B, the engaging part guide grooves 118 of the plunger 110b and the plate-like protruding pieces 158 of the base member 150b are circumferentially aligned with each other. The plunger 110b is thus freed from the state wherein it is locked to the base member 150b so that the tensioner becomes usable, i.e., with the plunger 110b being able to extend out and retract, as shown in FIG. 12G.

As described above, the plunger stopper mechanism of the tensioner according to this embodiment is configured such that the engaging part 153 of the base member 150b directly engages the locking notch 113 of the plunger 110b, and that the plunger 110b can be unlocked by rotating the base member 150b relative to the plunger 110b.

While specific examples of the tensioner according to the present invention have been described in the embodiment above, the tensioner according to the present invention is not limited to these examples, and the shapes, positions, sizes, and positional relationships with each other of various constituent parts may be changed in various manners, or variously combined as required.

In the embodiments described above, illustrations in which the plunger protrudes upwards were used and the plunger was described as being protruded in this direction, but the plunger may be arranged to protrude in any direction in accordance with the mode in which it is used.

It is preferable, in the embodiments described above in particular, to dispose the chain tensioner such that the oil reservoir chamber is located higher than the check valve (opposite of the illustration). The relief valve will then be located higher than the oil pressure chamber and the tensioner can have enhanced robustness with respect to air leak possibilities.

The tensioner of the present invention may not necessarily be applied to a chain guide mechanism that uses a guide shoe for slidably guiding a drive chain such as an endless roller chain passing over respective sprockets of a crankshaft and a cam shaft in an engine room, but may also be adopted in applications where the chain is slidably guided directly by the distal end of the plunger.

The tensioner may not necessarily be applied to a chain drive mechanism but also used for similar drive mechanisms that use belts, ropes and the like, and can be applied in a variety of industrial fields.

What is claimed is:

1. A tensioner comprising:
   a cylindrical plunger with a closed front end;
   a biasing means accommodated in an oil pressure chamber that is formed inside the plunger such as to freely extend and contract;

a cylindrical base member loosely fitted into an open rear end of the plunger against resiliency of the biasing means;

a plunger stopper mechanism that prevents the plunger from extending out from the base member, the plunger stopper mechanism being made up of an engaging groove provided on an inner circumferential surface of a rear end portion of the plunger such as to extend circumferentially all around, and an engaging part provided on a front end portion of the base member to detachably engage a locking notch formed by the engaging groove directly or via another member; and the plunger stopper mechanism is configured so that engagement of the engaging part of the base member to the locking notch provided in the plunge fixes the plunger to the base member, and disengagement of the engagement part from the locking notch detaches the plunger from the base member and the tensioner is rendered usable.

2. The tensioner according to claim 1, further comprising a C-ring disposed on the locking notch of the plunger, configured to engage with a rear end face of the engaging part of the base member, and configured to be radially compressed so as to press an inner circumferential surface of the engaging groove radially outward, and a release groove with a larger depth than that of the engaging groove formed on an inner circumferential surface of the plunger for receiving the C-ring that expands radially when the plunger is slid rearward in a spring compressing direction.

3. The tensioner according to claim 1, further comprising a ball disposed on the locking notch of the plunger and configured to engage with a rear end face of the engaging part of the base member, and an axially extending ball release groove formed on at least one of an inner circumferential surface of the plunger and an outer circumferential surface of the base member and configured to allow the ball to be taken out when the base member is rotated relative to the plunger.

4. The tensioner according to claim 1, wherein the engaging part of the base member is formed by a plurality of plate-like protruding pieces protruding radially outward and each having a rear end face configured to engage with an end face of the locking notch, the tensioner further comprising a plurality of axially extending engaging part guide grooves formed on an inner circumferential surface of the plunger and configured to allow the plate-like protruding pieces to slide when the base member is rotated relative to the plunger.

5. The tensioner according to claim 1, wherein the base member includes a mounting part for attachment of the tensioner to an object to which the tensioner is mounted.

6. The tensioner according to claim 5, wherein the mounting part is formed by a thread groove on an outer circumferential surface of the base member.

7. The tensioner according to claim 5, wherein the mounting part is formed by an axially extending engaging groove on an outer circumferential surface of the base member.

* * * * *